United States Patent
Takatori et al.

(10) Patent No.: US 11,965,123 B2
(45) Date of Patent: Apr. 23, 2024

(54) RED PHOSPHOR AND METHOD FOR PRODUCING SAME

(71) Applicant: STELLA CHEMIFA CORPORATION, Osaka (JP)

(72) Inventors: Hiroaki Takatori, Osaka (JP); Shinya Kumazawa, Osaka (JP); Tetsuya Arakawa, Osaka (JP); Tetsuo Nishida, Osaka (JP)

(73) Assignee: STELLA CHEMIFA CORPORATION (JP)

( * ) Notice: Subject to any disclaimer, the term of this patent is extended or adjusted under 35 U.S.C. 154(b) by 135 days.

(21) Appl. No.: 17/442,653

(22) PCT Filed: Mar. 19, 2020

(86) PCT No.: PCT/JP2020/012443
§ 371 (c)(1),
(2) Date: Sep. 24, 2021

(87) PCT Pub. No.: WO2020/209032
PCT Pub. Date: Oct. 15, 2020

(65) Prior Publication Data
US 2022/0186115 A1 Jun. 16, 2022

(30) Foreign Application Priority Data

Apr. 9, 2019 (JP) .................................. 2019-073863
Mar. 17, 2020 (JP) .................................. 2020-046788

(51) Int. Cl.
*C09K 11/61* (2006.01)
*C01B 33/10* (2006.01)
*C09K 11/02* (2006.01)

(52) U.S. Cl.
CPC .......... *C09K 11/617* (2013.01); *C01B 33/103* (2013.01); *C09K 11/025* (2013.01); *C01P 2002/54* (2013.01); *C01P 2004/80* (2013.01)

(58) Field of Classification Search
CPC .. C09K 11/617; C09K 11/025; C01P 2004/80
See application file for complete search history.

(56) References Cited

U.S. PATENT DOCUMENTS

| | | |
|---|---|---|
| 2015/0315462 A1 | 11/2015 | Murphy et al. |
| 2018/0053881 A1 | 2/2018 | Murphy et al. |
| 2019/0002759 A1* | 1/2019 | D'Amico .............. H01L 33/502 |
| 2019/0048258 A1 | 2/2019 | Du et al. |

FOREIGN PATENT DOCUMENTS

| | | |
|---|---|---|
| CN | 106459750 A | 2/2017 |
| CN | 107406762 A | 11/2017 |
| JP | 2009-528429 A | 8/2009 |
| JP | 2017-149862 A | 8/2017 |
| JP | 2017-524775 A | 8/2017 |
| JP | 2017-186524 A | 10/2017 |
| TW | 201829740 A | 8/2018 |
| WO | WO 2007/100824 A2 | 9/2007 |
| WO | WO 2015/093430 A1 | 6/2015 |
| WO | WO 2016/014392 * | 1/2016 |
| WO | WO 2016/014392 A1 | 1/2016 |
| WO | WO 2018/005448 A1 | 1/2018 |
| WO | WO 2018/0938322 A2 | 5/2018 |

OTHER PUBLICATIONS

Office Action dated Nov. 2, 2022 for corresponding Chinese Patent Application No. 202080011140.2 with English translation.
International Search Report dated Jun. 2, 2020 in corresponding PCT International Application No. PCT/JP2020/012443.
Hoang-Duy Nguyen et al., "Waterproof Alkyl Phosphate Coated Fluoride Phosphors for Optoelectronic Materials," Angew. Chem. Int., vol. 54, No. 37, pp. 10862-10866 (2015).
Extended European Search Report dated Apr. 12, 2022 in corresponding European Patent Application 20787236.7.

* cited by examiner

Primary Examiner — C Melissa Koslow
(74) Attorney, Agent, or Firm — OSTROLENK FABER LLP

(57) ABSTRACT

A red phosphor that has optical characteristics and durability under high-temperature and high-humidity environments, and a method for producing the same. The red phosphor includes a Mn-activated complex fluoride represented by the following general formula (1) and bismuth:

$$A_2MF_6:Mn^{4+} \quad (1)$$

wherein A represents at least one alkali metal element selected from the group consisting of lithium, sodium, potassium, rubidium and cesium, and M represents at least one tetravalent element selected from the group consisting of silicon, germanium, tin, titanium, zirconium and hafnium.

11 Claims, No Drawings

RED PHOSPHOR AND METHOD FOR PRODUCING SAME

CROSS-REFERENCE TO RELATED APPLICATIONS

The present application is a 35 U.S.C. §§ 371 national phase conversion of International Application No. PCT/JP2020/012443, filed Mar. 19, 2020, which claims priority to Japanese Patent Application Nos. 2019-073863 and 2020-046788, filed Apr. 9, 2019 and Mar. 17, 2020, respectively, the contents of both of which are incorporated herein by reference. The PCT International Application was published in the Japanese language.

TECHNICAL FIELD

The present invention relates to a red phosphor which is excited by excitation light such as ultraviolet light and blue light to emit red light, and a method for producing the same. More particularly, the present invention relates to a red phosphor having excellent optical properties and durability under high-temperature and high-humidity environments by including bismuth in Mn (manganese)—activated complex fluoride, and a method for producing the same.

BACKGROUND ART

White LEDs (light emitting diodes) have a longer life and lower power consumption than fluorescent lamps. Therefore, it has rapidly become widespread as a backlight for lighting equipment and displays. The white LED of a commercially available lighting equipment is composed of a combination of a blue LED which emits near-ultraviolet light to blue light, and a yellow phosphor which is excited by the light. As a result, the white LED enables the irradiation of pseudo-white light by mixing the light emitted by the blue LED and the light emitted by the yellow phosphor. However, since the pseudo-white light emitted by the white LED contains little or no light emitting component in the red light region, the pseudo-white light has a problem that color rendering properties (which mean properties of how colors appears under the illumination when the object is visually recognized as compared with natural light (or sunlight, black body radiation). For example, when the object is illuminated by lighting and the colors appear similar to those when illuminated by natural light, it exhibits high color rendering properties)) are inferior as compared with natural light.

Therefore, there is a need for a red phosphor which is excited by ultraviolet light emitted by a near-ultraviolet LED or blue light emitted by a blue LED to emit red light. There has recently been developed, as such a red phosphor, a phosphor composition composed of Mn-activated complex fluoride ($K_2SiF_6:Mn^{4+}$ (KSF:Mn)) which emits red light centered on transition metal $Mn^{4+}$ ions (see, for example, Patent Documents 1 and 2, and Non-Patent Document 1), and its adoption is rapidly advancing. KSF:Mn has an excitation band at the wavelength of blue light, and has a red emission peak with a narrow half-value width in a narrow band of 600 to 650 nm.

In KSF:Mn, $K_2SiF_6$ crystals act as the framework of the phosphor, and $Mn^{4+}$ ions are solid-soluted at the Si' position of the hexacoordinate-octahedral site formed by $SiF_6^{2-}$ ions to form an $MnF_6^{2-}$ octahedral site, thus acting as a luminescent center.

However, it has been pointed out that this red phosphor composed of KSF:Mn has a practical problem that the particle surface is darkened when it comes into contact with water, water vapor or the like under high-temperature and high-humidity environments. Specifically, manganese dioxide is generated by reacting tetravalent manganese ions constituting the red phosphor with water on the particle surface of the red phosphor, and this manganese dioxide causes absorption of excitation light and suppression of fluorescence, leading to deterioration of optical properties and deterioration of optical properties with time (degradation of durability).

PRIOR ART DOCUMENTS

Patent Documents

Patent Document 1: JP 2009-528429 A
Patent Document 2: WO2015/093430

Non-Patent Documents

Non-Patent Document 1: H. D. Nguyen, C. C. Lin, R. S. Liu, Angew. Chem. Volume 54, 37, p. 10862(2015)

SUMMARY OF THE INVENTION

Problems to be Solved by the Invention

The present invention has been made in view of the above problems, and an object thereof is to provide a red phosphor having excellent optical characteristics and durability under high-temperature and high-humidity environments, and a method for producing the same.

Solutions to the Problems

In order to solve the above-mentioned problems, the present invention is a red phosphor comprising a Mn-activated complex fluoride represented by the following general formula (1) and bismuth:

$$A_2MF_6:Mn^{4+} \quad (1)$$

wherein A represents at least one alkali metal element selected from the group consisting of lithium, sodium, potassium, rubidium and cesium, and M represents at least one tetravalent element selected from the group consisting of silicon, germanium, tin, titanium, zirconium and hafnium.

In the configuration, the Mn-activated complex fluoride may be particulate, and the bismuth is present on at least a part of the surface of the particulate Mn-activated complex fluoride.

In the configuration, a coating layer may be provided on the surface of the particulate Mn-activated complex fluoride, and the coating layer contains the bismuth.

In the configuration, it is preferable that the coating layer is composed of a bismuth elemental substance and/or a bismuth compound.

In the configuration, it is preferable that the bismuth compound is at least one selected from the group consisting of $BiF_3$, $BiCl_3$, $BiBr_3$, $BiI_3$, $Bi_2O_3$, $Bi_2S_3$, $Bi_2Se_3$, BiSb, $Bi_2Te_3$, $Bi(OH)_3$, $(BiO)_2CO_3$, BiOCl, $BiPO_4$, $Bi_2Ti_2O_7$, $Bi(WO_4)_3$, $Bi_2(SO_4)_3$, $BiOCH_3COO$, $4BiNO_3(OH)_2·BiO$ (OH), $C_3F_9O_9S_3Bi$, $C_7H_7BiO_7$, $C_9H_{21}BiO_3$, $Ci_5H_{33}BiO_3$, $C_{30}H_{57}BiO_6$, $C_{12}H_{10}BiK_3O_{14}$, and $C_6H_4(OH)CO_2BiO·H_2O$.

In the configuration, it is preferable that the content of bismuth is in a range of 0.01% by mass to 15% by mass with respect to the total mass of the red phosphor.

In the configuration, it is preferable that a molar ratio of Mn in the Mn-activated complex fluoride is in a range of 0.005 to 0.15 relative to the total number of mols of M and Mn.

In order to solve the above-mentioned problems, the present invention is a method for producing red phosphor, which comprises a step of bringing a treatment liquid containing bismuth into contact with the Mn-activated complex fluoride represented by the following general formula (1):

$$A_2MF_6:Mn^{4+} \quad (1)$$

wherein A represents at least one alkali metal element selected from the group consisting of lithium, sodium, potassium, rubidium and cesium, and M represents at least one tetravalent element selected from the group consisting of silicon, germanium, tin, titanium, zirconium and hafnium.

In the configuration, it is preferable that the content of bismuth in the treatment liquid is in a range of 0.01% by mass to 15% by mass relative to the total mass of the treatment liquid.

In the configuration, it is preferable that a solvent of the treatment liquid is water, an organic solvent, a mixed solvent thereof, or an acidic solvent thereof.

In the configuration, it is preferable that the acidic solvent is an acidic solvent containing hydrogen fluoride, and a mixing ratio of the acidic solvent containing hydrogen fluoride to the bismuth is in a range of 30:1 to 3,500:1 on a mass basis.

In the configuration, it is preferable that the concentration of the hydrogen fluoride in the acidic solvent containing hydrogen fluoride is in a range of 1% by mass to 70% by mass relative to the total mass of the acidic solvent.

In the configuration, it is preferable that bismuth is contained in the treatment liquid as at least one selected from the group consisting of Bi elemental substance, $BiF_3$, $BiCl_3$, $BiBr_3$, $BiI_3$, $Bi_2O_3$, $Bi_2S_3$, $Bi_2Se_3$, $BiSb$, $Bi_2Te_3$, $Bi(OH)_3$, $(BiO)_2CO_3$, $BiOCl$, $BiPO_4$, $Bi_2Ti_2O_7$, $Bi(WO_4)_3$, $Bi_2(SO_4)_3$, $BiOCH_3COO$, $4BiNO_3(OH)_2 \cdot BiO(OH)$, $C_3F_9O_9S_3Bi$, $C_7H_7BiO_7$, $C_9H_{21}BiO_3$, $C_{15}H_{33}BiO_3$, $C_{30}H_{57}BiO_6$, $C_{12}H_{10}BiK_3O_{14}$, and $C_6H_4(OH)CO_2BiO \cdot H_2O$.

Effects of the Invention

The present invention exerts the following effects by the means mentioned above.

That is, according to the red phosphor of the present invention, inclusion of bismuth in addition to the Mn-activated complex fluoride reduces or prevents formation of colored manganese dioxide due to a reaction of Mn' with water. As a result, it is possible to prevent absorption of excitation light and suppression of fluorescence due to manganese dioxide, thus making it possible to provide a red phosphor which has satisfactory optical properties and reduces deterioration of the optical properties due to change with time under high-temperature and high-humidity environments, and also has excellent durability.

According to the method for producing a red phosphor of the present invention, it is possible to produce a red phosphor including bismuth by bringing a treatment liquid containing bismuth into contact with the Mn-activated complex fluoride. As a result, it becomes possible to produce a red phosphor which has satisfactory optical properties and reduces deterioration of the optical properties due to change with time under high-temperature and high-humidity environments, and also has excellent durability.

EMBODIMENT OF THE INVENTION (Red Phosphor)

The red fluorescent substance according to the present embodiment will be described below.

The red phosphor according to the present embodiment includes a Mn-activated complex fluoride represented by the following general formula (1) (hereinafter sometimes referred to as "Mn-activated complex fluoride") and bismuth:

$$A_2MF_6:Mn^{4+} \quad (1)$$

where A represents at least one alkali metal element selected from the group consisting of lithium, sodium, potassium, rubidium and cesium, and M represents at least one tetravalent element selected from the group consisting of silicon, germanium, tin, titanium, zirconium and hafnium.

The red phosphor of the present embodiment may be a single red phosphor, or a mixture of two or more red phosphors.

In the general formula $A_2MF_6:Mn^{4+}$ which represents the Mn-activated compound fluoride, "$A_2MF_6$" represents the composition of a host crystal of the red phosphor. Further, "$Mn^{4+}$" represents an activated ion which is the center of the luminescent.

In the present specification, the term "activation" means the addition of $Mn^{4+}$, which is an activator, to $A_2MF_6$, which is a host crystal, in order to express fluorescence. Examples of the activated form include a form in which Mn' is partially substituted with an arbitrary atom constituting $A_2MF_6$. In case of the present embodiment, it is preferable that $Mn^{4+}$ is substituted with M of the host crystal.

Specific examples of the Mn-activated complex fluoride represented by the general formula $A_2MF_6:Mn^{4+}$ include $Li_2SiF_6:Mn^{4+}$, $Na_2SiF_6:Mn^{4+}$, $K_2SiF_6:Mn^{4+}$, $Rb_2SiF_6:Mn^{4+}$, $Cs_2SiF_6:Mn^{4+}$, $Li_2GeF_6:Mn^{4+}$, $Na_2GeF_6:Mn^{4+}$, $K_2GeF_6:Mn^{4+}$, $Rb_2GeF_6:Mn^{4+}$, $Cs_2GeF_6:Mn^{4+}$, $Li_2SnF_6:Mn^{4+}$, $Na_2SnF_6:Mn^{4+}$, $K_2SnF_6:Mn^{4+}$, $Rb_2SnF_6:Mn^{4+}$, $Cs_2SnF_6:Mn^{4+}$, $Li_2TiF_6:Mn^{4+}$, $Na_2TiF_6:Mn^{4+}$, $K_2TiF_6:Mn^{4+}$, $Rb_2TiF_6:Mn^{4+}$, $Cs_2TiF_6:Mn^{4+}$, $Li_2ZrF_6:Mn^{4+}$, $Na_2ZrF_6:Mn^{4+}$, $K_2ZrF_6:Mn^{4+}$, $Rb_2ZrF_6:Mn^{4+}$, $Cs_2ZrF_6:Mn^{4+}$, $Li_2HfF_6:Mn^{4+}$, $Na_2HfF_6:Mn^{4+}$, $K_2HfF_6:Mn^{4+}$, $Rb_2HfF_6:Mn^{4+}$, $Cs_2HfF_6:Mn^{4+}$ and the like. Of these Mn-activated complex fluoride, $K_2SiF_6:Mn^{4+}$, $K_2TiF_6:Mn^{4+}$, $K_2GeF_6:Mn^{4+}$, $Na_2SiF_6:Mn^{4+}$, $Na_2TiF_6:Mn^{4+}$ and $Na_2GeF_6:Mn^{4+}$ are preferable, and $K_2SiF_6:Mn^{4+}$ and $K_2TiF_6:Mn^{4+}$ are more preferable, from the viewpoint of ease of availability and ease of synthesis. The Mn-activated complex fluoride can be selected according to the optical properties required for various applications. Therefore, it is not particularly limited to the exemplified Mn-activated complex fluorides.

In the present specification, the term "optical properties" mean absorptivity and internal quantum efficiency of the red phosphor, and the like. The term "absorptivity" means efficiency with which the red phosphor absorbs excitation light. For example, when a peak value of a spectral radiance of excitation light (wavelength: 449 nm) emitted from a blue LED is Ex1 and a peak value of excitation light which is not absorbed by the red phosphor is Ex2, an absorptivity α is calculated by the following mathematical formula (1).

Absorptivity α(%)=(Ex1−Ex2)/Ex1×100     (1)

The term "internal quantum efficiency" means that efficiency of converting excitation light absorbed by the red phosphor into fluorescence. For example, when a peak value of a spectral radiance of the fluorescence of the red phosphor is Ex2 under irradiation with excitation light (wavelength: 449 nm) from a blue LED, an internal quantum efficiency η is represented by the following mathematical formula (2).

$$\text{Internal quantum efficiency } \eta(\%)=Em/(Ex1-Ex2)\times 100 \quad (2)$$

The Mn-activated complex fluoride is solid, and preferably particulate. When the Mn-activated complex fluoride is particulate, an average particle size thereof is not particularly limited as long as the ratio of scattering to excitation light does not increase excessively as compared with absorption and conversion, and any inconvenience does not occur when mixing with a resin so as to be mounted on an LED device.

The molar ratio of Mn is preferably in a range of 0.005 to 0.15, more preferably 0.01 to 0.13, still more preferably 0.02 to 0.12, and particularly preferably 0.03 to 0.1, relative to the total number of mols of M and Mn in the red phosphor (or Mn-activated complex fluoride). By setting the molar ratio at 0.005 or more, satisfactory emission intensity of the red phosphor can be maintained. Meanwhile, by setting the molar ratio at 0.15 or less, it is possible to prevent excessive deterioration of the durability of the red phosphor under high-temperature and high-humidity environments.

As used herein, the term "durability" means the degree to which initial optical properties of the red phosphor are maintained when the red phosphor is stored for a certain period of time under high-temperature and high-humidity environments. The meaning of the optical properties is as mentioned above.

The bismuth may be present on at least a part of the surface of the Mn-activated complex fluoride, and more preferably, it covers at least a part of the surface as a coating layer. Bismuth may exist in the form of a bismuth elemental substance and/or a bismuth compound.

It is considered that colored manganese dioxide is formed on the surface of the Mn-activated complex fluoride by reacting tetravalent manganese ions constituting the Mn-activated complex fluoride with water, thus causing darkening on the particle surface of Mn-activated complex fluoride. It is presumed that the occurrence of this darkening accelerates under high-temperature and high-humidity, leading to deterioration of optical properties and deterioration of durability of the red phosphor. However, in case of the red phosphor of the present embodiment, the presence of bismuth on at least a part of the surface of the Mn-activated complex fluoride reduces or prevent the reaction of tetravalent manganese ions in contact with water. In particular, when bismuth is present as a coating layer on the surface of the Mn-activated complex fluoride, it suppresses the infiltration of water and water vapor into the red phosphor, thereby improving the durability under high-temperature and high-humidity environments and improving the optical properties.

From the viewpoint of preventing the formation of manganese dioxide, it is preferable that the entire surface of the Mn-activated complex fluoride is coated with a coating layer containing bismuth. However, coating the entire surface of the Mn-activated complex fluoride with the coating layer may not be industrially suitable from the viewpoint of production cost and ease of production. Even if bismuth is present on a part of the surface of the Mn-activated complex fluoride, it is not always necessarily that the entire surface of Mn-activated complex fluoride is coated with the coating layer because the durability and optical properties can be improved under high-temperature and high-humidity environments. The degree of coating with the coating layer is preferably changed as appropriate according to the application of the red phosphor and the required performance according to the application.

The film thickness of the coating layer is not particularly limited as long as at least the deterioration of optical properties due to contact with water and the durability under high-temperature and high-humidity environments can be improved in the region of the Mn-activated complex fluoride coated by the coating layer.

The bismuth compound is not particularly limited as long as it does not adversely affect the optical properties of the red phosphor. Specific examples of the bismuth compound include at least one selected from the group consisting of bismuth(III) halides composed of $BiF_3$, $BiCl_3$, $BiBr_3$ and $BiI_3$, $Bi_2O_3$, $Bi_2S_3$, $Bi_2Se_3$, $BiSb$, $Bi_2Te_3$, $Bi(OH)_3$, $(BiO)_2CO_3$, $BiOCl$, $BiPO_4$, $Bi_2Ti_2O_7$, $Bi(WO_4)_3$, $B_{12}(SO_4)_3$, $BiOCH_3COO$, $4BiNO_3(OH)_2 \cdot BiO(OH)$, $C_3F_9O_9S_3Bi$, $C_7H_7BiO_7$, $C_9H_{21}BiO_3$, $C_{15}H_{33}BiO_3$, $C_{30}H_{57}BiO_6$, $Ci_2H_{10}BiK_3O_{14}$, and $C_6H_4(OH)CO_2BiO \cdot H_2O$. Of these bismuth compounds, bismuth(III) halides composed of $BiF_3$, $BiCl_3$, $BiBr_3$ and $BiI_3$, $Bi_2O_3$, $Bi_2S_3$, $Bi_2Se_3$, $BiSb$, $Bi_2Te_3$, $Bi(OH)_3$, $(BiO)_2CO_3$, $BiOCl$, $BiPO_4$, $Bi_2Ti_2O_7$, $Bi(WO_4)_3$, $Bi_2(SO_4)_3$, $4BiNO_3(OH)_2 \cdot BiO(OH)$, and an inorganic bismuth salt such as $C_3F_9O_9S_3Bi$ are preferable, and $BiF_3$ and $Bi(NO_3)_3$ are more preferable. The bismuth compound is particularly preferably $BiF_3$ from the viewpoint of improving the durability and optical properties of the red phosphor under high-temperature and high-humidity environments.

The content of bismuth is preferably in a range of 0.01% by mass to 15% by mass, more preferably 0.01% by mass to 10% by mass, still more preferably 0.05% by mass to 10% by mass, and particularly preferably 0.1% by mass to 5% by mass, relative to the total mass of the red phosphor. By setting the content of the bismuth compound at 0.01% by mass or more, it is possible to improve the durability of the red phosphor under high-temperature and high-humidity environments. Meanwhile, by decreasing the content of the bismuth compound to 15% by mass or less, deterioration of the optical properties can be further reduced.

The (initial) absorptivity of the red phosphor is preferably in a range of 50% to 100%, more preferably 55% to 100%, and still more preferably 60% to 100%. By setting the absorptivity to 50% or more, the optical properties of the red phosphor can be satisfactorily maintained. In particular, in the present invention, since a decrease in absorption of excitation light by the red phosphor is suppressed even after storage under high-temperature and high-humidity environments for a certain period of time, satisfactory optical properties can be maintained. The numerical range of the absorptivity applies not only to the initial absorptivity of the red phosphor, but also to the absorptivity after storage of the red phosphor under high-temperature and high-humidity environments for a certain period of time. Definition of the absorptivity is as mentioned above.

The (initial) internal quantum efficiency of the red phosphor is preferably in a range of 70% to 100%, more preferably 75% to 100%, and still more preferably 80% to 100%. By setting the internal quantum efficiency at 70% or more, the luminous efficiency of the red phosphor can be satisfactorily maintained. The numerical range of the internal quantum efficiency applies not only to the initial internal quantum efficiency of the red phosphor, but also to the internal quantum efficiency after storage of the red phosphor under high-temperature and high-humidity environments for a certain period of time. Definition of internal quantum efficiency is as mentioned above.

The red phosphor of the present embodiment is suitable as, for example, a red phosphor for a white LED using blue light as a light source. The red phosphor of the present embodiment can be suitably used for a light emitting device such as lighting equipment and an image display device.

(Method for Producing Red Phosphor)

The method for producing a red phosphor according to the present embodiment will be described below.

The method for producing a red phosphor of the present embodiment includes at least a step of bringing a treatment liquid containing bismuth into contact with a Mn-activated complex fluoride represented by the general formula (1). In this contact step, surface modification (surface treatment) of the Mn-activated complex fluoride is performed by bringing a treatment liquid containing bismuth into contact with the Mn-activated complex fluoride, and bismuth is allowed to exist on at least a part of the surface, thus enabling the formation of a coating layer containing bismuth, more preferably.

The treatment liquid containing bismuth contains a bismuth elemental substance and/or a bismuth compound. In the treatment liquid containing bismuth, all the added bismuth elemental substance and/or the bismuth compound may be completely dissolved, or a part thereof may exist as an undissolved bismuth and an undissolved bismuth compound without being dissolved.

Examples of the bismuth compound include at least one selected from the group consisting of bismuth(III) halides composed of $BiF_3$, $BiCl_3$, $BiBr_3$ and $BiI_3$, $Bi_2O_3$, $Bi_2S_3$, $Bi_2Se_3$, $BiSb$, $Bi_2Te_3$, $Bi(OH)_3$, $(BiO)_2CO_3$, $BiOCl$, $BiPO_4$, $Bi_2Ti_2O_7$, $Bi(WO_4)_3$, $Bi_2(SO_4)_3$, $BiOCH_3COO$, $4BiNO_3$ $(OH)_2 \cdot BiO(OH)$, $C_3F_9O_9S_3Bi$, $C_7H_7BiO_7$, $C_9H_{21}BiO_3$, $C_{15}H_{33}BiO_3$, $C_{30}H_{57}BiO_6$, $C_{12}H_{10}BiK_3O_{14}$, and $C_6H_4(OH)$ $CO_2BiO \cdot H_2O$.

Examples of the solvent of the treatment liquid containing bismuth include water, an organic solvent, a mixed solvent thereof, or an acidic solvent thereof.

Examples of the organic solvent include, but are not particularly limited to, methyl alcohol, ethyl alcohol, isopropyl alcohol, isobutyl alcohol, methyl acetate, ethyl acetate, tetrahydrofuran, 1,2-dimethoxyethane and the like. Of these organic solvents, methyl alcohol, ethyl alcohol, isopropyl alcohol and isobutyl alcohol are preferable, and methyl alcohol and ethyl alcohol are particularly preferable, from the viewpoint of ease of availability and simplicity of working environment.

The acidic solvent means a solvent which contains a proton-containing acid. Examples of the proton-containing acid include, but are not particularly limited to, hydrogen fluoride, nitric acid, sulfuric acid, hydrochloric acid and the like. From the viewpoint of the production process and the properties of the red phosphor, hydrogen fluoride and nitric acid are preferable, and hydrogen fluoride is particularly preferable.

The content of bismuth in the treatment liquid is preferably in a range of 0.01% by mass to 15% by mass, more preferably 0.05% by mass to 10% by mass, and particularly preferably 0.1% by mass to 5% by mass, relative to the total mass of the treatment liquid. By setting the content of bismuth at 15% by mass or less, the optical properties of the red phosphor can be satisfactorily maintained. Meanwhile, by setting the content of bismuth at 0.01% by mass or more, the optical properties and durability of the red phosphor under high-temperature and high-humidity environments can be further improved.

The content of bismuth can be measured by a chemical analyzer by atomic absorption spectrophotometry or ICP atomic emission spectroscopy (high frequency inductively coupled plasma emission spectrometry) using the filtrate obtained by filtering the treatment liquid containing bismuth. It is also possible to calculate the difference between the mass of bismuth added to the solvent and the mass of the dissolution residue (residue) remaining on the filter paper when filtering the treatment liquid containing bismuth as the content (concentration) of bismuth dissolved in the treatment liquid containing bismuth.

When using, as the solvent of the treatment liquid, an acidic solvent containing hydrogen fluoride, i.e., hydrofluoric acid or a mixed solvent of the hydrofluoric acid and an organic solvent, a mixing ratio of the acidic solvent containing hydrogen fluoride to bismuth is preferably 30:1 to 3,500:1, more preferably 100:1 to 3,500:1, and particularly preferably 500:1 to 1,500:1, on a mass basis. By setting the mixing ratio at 3,500:1 or less, the amount of the treatment liquid discharged as waste liquid can be reduced, thus making it possible to reduce the environmental burden. Meanwhile, by setting the mixing ratio at 30:1 or more, the dispersibility of the bismuth elemental substance and/or the bismuth compound in the treatment liquid is improved, and after surface modification of the Mn-activated complex fluoride, it is possible to prevent bismuth from being existing non-uniformly on the surface of the Mn-activated complex fluoride.

The concentration of hydrogen fluoride in the acidic solvent containing hydrogen fluoride is preferably in a range of 1% by mass to 70% by mass, more preferably 10% by mass to 50% by mass, and particularly preferably 20% by mass to 40% by mass, relative to the total mass of the acidic solvent. By setting the concentration of hydrogen fluoride at 70% by mass or less, it is possible to suppress a decrease in solubility of the Mn-activated complex fluoride in an acidic solvent containing hydrogen fluoride. Meanwhile, by setting the concentration of hydrogen fluoride at 1% by mass or more, it is possible to suppress an increase in amount of the treatment liquid used, thus improving the productivity.

Examples of the method of bringing the treatment liquid containing bismuth into contact with the Mn-activated complex fluoride include, but are not particularly limited to, a method of adding (immersing) the Mn-activated complex fluoride to be treated in the treatment liquid, a method of spraying a treatment liquid and the like. From the viewpoint of industrially producing a red phosphor, a method of adding (immersing) the Mn-activated complex fluoride in the treatment liquid is preferable. By adding the Mn-activated complex fluoride, it is possible to obtain a suspension in which the Mn-activated complex fluoride is dispersed in the treatment liquid. There is no particular limitation on the number of times of adding, and the Mn-activated complex fluoride may be added in the treatment liquid at a time, or may be added a plurality of times.

There is no particular limitation on the mass ratio of the Mn-activated complex fluoride to the treatment liquid when adding the Mn-activated complex fluoride in the treatment liquid, and the mass ratio can be appropriately adjusted as long as it does not adversely affect the subsequent stirring and filtration (details of stirring and filtration will be mentioned later). However, from the viewpoint of work efficiency, the mass ratio of the treatment liquid to the Mn-activated complex fluoride is preferably in a range of 100:1 to 2:1, and more preferably 10:1 to 3:1. By setting the mass ratio at 100:1 or more, it is possible to prevent the amount of Mn-activated complex fluoride to be treated from becoming too small and the productivity of the red phosphor from degrading. Meanwhile, by setting the mass ratio at 2:1 or less, the dispersibility of the Mn-activated complex fluoride in the treatment liquid is satisfactory, thus making it possible to uniformly apply the bismuth compound.

After the step of contact between the Mn-activated complex fluoride and the treatment liquid, a stirring step of stirring the obtained suspension, a solid-liquid separation step of the suspension, a washing step of the solid-liquid separated, and a drying step of the solid after washing are sequentially performed, preferably.

There is no particular limitation on the stirring method in the stirring step, and stirring can be performed using a known stirring device. The stirring time of the suspension is not particularly limited, and can be appropriately adjusted in consideration of the efficiency of the production equipment. The stirring rate is not also particularly limited and can be set as needed.

The solid-liquid separation step is a step of separating dispersed solid particles from the suspension after the stirring step. Examples of the solid-liquid separation method include, but are not particularly limited, to a method of filtering a suspension and a method in which the suspension is left to stand to precipitate dispersed solid particles, followed by decantation. The standing time of the suspension is not particularly limited as long as the solid particles can be sufficiently precipitated.

The washing step is performed to wash the cake obtained by solid-liquid separation. In this washing step, water, an organic solvent, a mixed solvent thereof, or an acidic solvent thereof can be used as a washing agent. The washing time and the number of washings are not particularly limited and can be set as needed.

Examples of the organic solvent used in the washing step include, but are not particularly limited to, methyl alcohol, ethyl alcohol, isopropyl alcohol, isobutyl alcohol, methyl acetate, ethyl acetate, tetrahydrofuran, 1,2-dimethoxyethane, acetone and the like. From the viewpoint of ease of availability and simplicity of working environment, methyl alcohol, ethyl alcohol, isopropyl alcohol, isobutyl alcohol and acetone are preferable, and ethyl alcohol, isopropyl alcohol and acetone are particularly preferable.

The acidic solvent used in the washing step means a solution containing a proton-containing acid. Examples of the proton-containing acid include, but are not particularly limited to, hydrogen fluoride, nitric acid, sulfuric acid, hydrochloric acid and the like. The content of the proton-containing acid is preferably in a range of 0.1% by mass to 60% by mass, more preferably 1% by mass to 55% by mass, and particularly preferably 5% by mass to 50% by mass, with respect to the total mass of the acidic solvent.

The cake after the washing step is subjected to the drying step. Thereby, it is possible to distill off the solvent component of the treatment liquid remaining on the cake and the washing agent used in the washing step. Examples of the drying method include, but are not particularly limited to, heat-drying and hot-air drying. Heat-drying is preferably performed under an atmosphere of nitrogen gas. The drying temperature is preferably in a range of 60° C. to 200° C., more preferably 70° C. to 150° C., and particularly preferably 80° C. to 110° C. By setting the drying temperature at 60° C. or higher, the drying efficiency can be satisfactorily maintained. It is also possible to prevent the residual impurities and suppress deterioration of the optical properties of the red phosphor due to the residual impurities. Meanwhile, by setting the drying temperature at 200° C. or lower, it is possible to prevent the obtained red phosphor from being degraded by heat. In case of heat-drying, the drying time is preferably in a range of 0.5 hour to 20 hours, and more preferably 2 hours to 15 hours. By setting the drying time at 0.5 hour or more, it is possible to prevent impurities from remaining and to suppress deterioration of the optical properties of the red phosphor due to the residual impurities. Meanwhile, by setting the drying time to 20 hours or less, it is possible to prevent a decrease in production efficiency of the red phosphor.

From the above, it is possible to produce a red phosphor in which bismuth is present on at least a part of the surface of the Mn-activated complex fluoride. It is presumed that the bismuth elemental substance and/or the bismuth compound is/are precipitated on the surface of the Mn-activated complex fluoride in the process of stirring the suspension in the stirring step. Alternatively, it is presumed that in the process of drying the Mn-activated complex fluoride having a surface, to which the treatment liquid is adhered, in the process of drying in the drying step, the bismuth elemental substance and/or the bismuth compound is/are precipitated on the surface of Mn-activated complex fluoride by distilling off the solvent component of the treatment liquid.

When the treatment liquid containing bismuth dissolves only a part of bismuth and contains bismuth remaining without being dissolved, the undissolved bismuth sometimes remain as a elemental substance on the surface of the Mn-activated complex fluoride. However, in the present invention, even in such a case, the undissolved bismuth may remain on the surface of the Mn-activated complex fluoride as long as it does not adversely affect the optical properties of the red phosphor. If the remained undissolved bismuth causes deterioration of the optical properties of the red phosphor, unfavorably, it is required to use a treatment solution containing bismuth dissolved completely therein, or to adjust the bismuth content to prevent the undissolved bismuth from being formed.

(Other Matters)

While a preferred embodiment of the present invention has been described in the above description, the present invention is not limited to the embodiment and can be implemented in various other embodiments.

For example, in the above description, regarding the method for producing a red phosphor, a method of adding the Mn-activated complex fluoride in the treatment liquid was exemplified as a method of bringing the treatment liquid containing bismuth into contact with the Mn-activated complex fluoride. However, the present invention is not limited to this method. For example, it is possible to use a method of spraying the treatment liquid over the Mn-activated complex fluoride which is the object to be treated. The amount of the treatment liquid sprayed is not particularly limited and can be set as appropriate. After spraying the treatment liquid over the Mn-activated complex fluoride, the solvent component of the treatment liquid remaining on the surface of the Mn-activated complex fluoride is preferably distilled off. The method of distillation is not particularly limited, and for example, the above-mentioned drying step can be performed.

The method for producing a Mn-activated complex fluoride, which is a raw material of the red phosphor, is not particularly limited, and a known method can be employed. For example, examples of the method include a method in which a compound containing constituent elements of a Mn-activated complex fluoride is dissolved in a hydrofluoric acid solution, followed by mixing and further reaction crystallization (see H. D. Nguyen, C. C. Lin, R. S. Liu, Angew. Chem. Volume 54, 37, p 10862(2015)), a method in which a compound containing constituent elements of a Mn-activated complex fluoride is entirely dissolved or dispersed in a hydrofluoric acid solution, followed by evaporative concentration and further precipitation (see JP 2009-528429 W), a method in which compounds containing constituent elements of a Mn-activated complex fluoride are sequentially dissolved in a hydrofluoric acid solution and one of the manganese-free constituent elements of the solid Mn-activated complex fluoride is added thereto to precipitate crystals of $K_2SiF_6:Mn^{4+}$, followed by filtration and further drying (see WO2015/093430) and the like.

EXAMPLES

The present invention will be described in detail by way of Examples, but the present invention is not limited to the following Examples without departing from the scope of the present invention.
(Formation of Mn-Activated Complex Fluoride)

A Mn-activated complex fluoride was synthesized by the following method in accordance with the method mentioned in H. D. Nguyen, C. C. Lin, R. S. Liu, Angew. Chem. Volume 54, 37, p. 10862(2015).

First, 35 ml of a 48% by mass hydrofluoric acid solution was charged in a PFA container having an internal volume of 0.1 L. Next, while stirring the hydrofluoric acid solution, 1.2 g of $SiO_2$ was added and dissolved. Further, 0.3 g of $K_2MnF_6$ was added to this solution and dissolved.

Subsequently, 3.5 g of KF was slowly added to the solution over 15 minutes to obtain crystals. The thus obtained crystals were washed with a 20% by mass hydrofluoric acid solution and acetone, and then dried at 70° C. for 6 hours. As a result, $K_2SiF_6:Mn^{4+}$ as a Mn-activated complex fluoride was obtained.

Example 1

Bismuth fluoride ($BiF_3$) (0.15 g) was added to 16.6 ml of a 43% by mass hydrofluoric acid, followed by stirring for 5 minutes to prepare a suspension (hydrofluoric acid: bismuth=1,408:1 (mixing ratio on a mass basis)). Next, while stirring this suspension, 5.3 g of $K_2SiF_6:Mn^{4+}$ was added, followed by stirring for additional 10 minutes.

After completion of the stirring, the suspension was left to stand for 10 minutes to precipitate a dispersed solid. Then, suction filtration was performed to collect the residue. After adding ethanol to this residue, suction filtration was performed again to remove the supernatant, and this operation was repeated to wash the residue. The washed residue was collected and dried under a nitrogen atmosphere at a drying temperature of 105° C. to evaporate ethanol. As a result, a red phosphor according to Example 1 was fabricated.

Example 2

In this Example, the amount of bismuth fluoride added was changed from 0.15 g to 0.05 g (hydrofluoric acid: bismuth=423:1 (mixing ratio on a mass basis)). A red phosphor according to Example 2 was fabricated in the same manner as in Example 1, except for the above. [0077]

Example 3

In this Example, the amount of bismuth fluoride added was changed from 0.15 g to 0.015 g (hydrofluoric acid: bismuth=141:1 (mixing ratio on a mass basis)). A red phosphor according to Example 3 was fabricated in the same manner as in Example 1, except for the above. [0078]

Example 4

In this Example, the amount of bismuth fluoride added was changed from 0.15 g to 0.60 g (hydrofluoric acid: bismuth=35:1 (mixing ratio on a mass basis)). A red phosphor according to Example 4 was fabricated in the same manner as in Example 1, except for the above. [0079]

Example 5

In this Example, the amount of bismuth fluoride added was changed from 0.15 g to 0.90 g, and the amount of a 43% by mass hydrofluoric acid was changed from 16.6 ml to 21.5 ml (hydrofluoric acid:bismuth=35:1 (mixing ratio on a mass basis)). A red phosphor according to Example 5 was fabricated in the same manner as in Example 1, except for the above. [0080]

Example 6

In this Example, bismuth fluoride was changed to an aqueous solution of bismuth nitrate having a concentration of 40% by mass, and the amount added was changed from 0.15 g to 0.56 g (hydrofluoric acid:bismuth=140:1 (mixing ratio on a mass basis)). A red fluorescent substance according to Example 6 was fabricated in the same manner as in Example 1 except for above.[0081]

Example 7

In this Example, the concentration of a hydrofluoric acid was changed from 43% by mass to 35% by mass, and the amount of bismuth fluoride added was changed from 0.15 g to 0.015 g (hydrofluoric acid:bismuth=1408:1 (mixing ratio on a mass basis)). A red phosphor according to Example 7 was fabricated in the same manner as in Example 1, except for the above. [0082]

Comparative Example 1

In the present Comparative Example, the above-mentioned $K_2SiF_6:Mn^{4+}$ was used as the red phosphor.
(Evaluation of Red Phosphor)

The red phosphors according to Examples 1 to 7 and Comparative Example 1 were evaluated by the methods mentioned below.
<Molar Ratio of Mn and Content of Bismuth>

The manganese concentration and bismuth content of the red phosphors of Examples 1 to 7 and Comparative Example 1 were measured by energy dispersive X-ray spectrometry (EDX). The EDX measurement is a measurement method in which fluorescent X-rays generated when irradiating a sample with X-rays are measured, and elements constituting the sample and the concentration are analyzed.

The red phosphors of Examples 1 to 7 and Comparative Example 1 were placed on a sample stage of an EDX measuring device, respectively, and the manganese concentration and bismuth content were calculated. As the EDX measuring device, JSF-7800F schottky field emission scanning electron microscope (trade name, manufactured by JEOL, Ltd.) was used. The measurement conditions were as follows: an acceleration voltage of 15 kV, an irradiation current of 1.0000 nA and an energy range of 0 to 20 keV.

As a result of the measurement, the molar ratio of the total number of mols of Si and Mn, Mn (Mn/(Si+Mn)), in the red phosphor was 0.054, 0.054, 0.055, 0.054, 0.054, 0.055, 0.055, respectively, in case of the red phosphors of Examples 1 to 7, and was 0.055 in case of the red phosphor of Comparative Example 1.

In case of the red phosphors of Examples 1 to 7, the bismuth content was 4.1% by weight, 1.3% by weight, 0.4% by weight, 10.7% by weight, 14.9% by weight, 4.0% by weight and 0.4% by weight, respectively. In case of the red phosphor of Comparative Example 1, the bismuth content was less than the detection limit (0.01% by weight).

<Evaluation of Optical Properties of Red Phosphor>

In order to evaluate the optical properties of each of the red phosphors of Examples 1 to 7 and Comparative Example 1, the absorptivity and internal quantum efficiency of each red phosphor were determined.

The absorptivity and internal quantum efficiency were measured using a blue LED spot illuminator (trade name: TSPA22X8-57B, manufactured by AS ONE CORPORATION) and a spectroradiometer (trade name: SR-UL2, manufactured by TOPCON CORPORATION). That is, a white plate ($BaSO_4$, manufactured by JASCO Corporation) which reflects almost 100% of excitation light is set on the sample stage and the spectral radiance of excitation light (wavelength: 449 nm) was measured, and then a peak value thereof (Ex1) was measured.

Subsequently, a sample of the red phosphor of any one of Examples 1 to 7 or Comparative Example 1 was packed in the recess of the sample stage, and a spectral radiance peak value (Em) of fluorescence under irradiation with excitation light and the unabsorbed component of an excitation light peak value (Ex2) was measured, respectively.

The absorptivity α of each of the red phosphors of Examples 1 to 7 and Comparative Example 1 was calculated using the following mathematical formula (1). The results are shown in Table 1.

Absorptivity α(%)=(Ex1−Ex2)/Ex1×100  (1)

The internal quantum efficiency η of each of the red phosphors of Examples 1 to 7 and Comparative Example 1 was calculated using the following mathematical formula (2). The results are shown in Table 1.

Internal quantum efficiency η(%)=Em/(Ex1−Ex2)×100  (2)

<Evaluation of Durability of Red Phosphor>

The durability test was performed as follows. First, 0.3 g of each of the red phosphors of Examples 1 to 7 or Comparative Example 1 was placed in a PFA tray, which was set in a thermo-hygrostat controlled at a temperature of 80° C. and a relative humidity of 80%, followed by storage for 88 hours. Then, the absorptivity α and internal quantum efficiency η were determined by the above-mentioned methods, respectively. The absorptivity α and internal quantum efficiency η after storage of each red phosphor for 168 hours under an environment of a temperature of 80° C. and a relative humidity of 80% were also determined.

Furthermore, an index of the durability of the red phosphor under high-temperature and high-humidity environments was calculated from the values of the internal quantum efficiency before and after the durability test of each red phosphor, based on the following mathematical formula (3). The results are shown in Table 1.

(Durability index)=(internal quantum efficiency after durability test)/internal quantum efficiency before durability test)×100  (3)

Note that "after endurance test" in mathematical formula (3) means the case after storage for 88 hours under an environment of a temperature of 80° C. and a relative humidity of 80%, and the case after storage for 168 hours under the same environment.

(Results)

As shown in Table 1, inclusion of bismuth was confirmed in the red phosphors of Examples 1 to 7 in which the surface was treated with the treatment liquid containing bismuth fluoride. It was also confirmed that the red phosphors of Examples 1 to 7 exhibited improved durability under high-temperature and high-humidity environments as compared with the red phosphors of Comparative Example 1 which was not subjected to a surface treatment.

TABLE 1

| | | | Initial optical properties | | Durability | | | | | |
| | | | | | 0 Hour | | 88 Hours | | | 168 Hours | | |
| | Bi content (% by weight) | Mn molar ratio | Absorptivity (%) | Internal quantum efficiency (%) | Absorptivity (%) | Internal quantum efficiency (%) | Durability index (%) | Absorptivity (%) | Internal quantum efficiency (%) | Durability index (%) |
|---|---|---|---|---|---|---|---|---|---|---|
| Example 1 | 4.1 | 0.054 | 77 | 88 | 79 | 86 | 98.8 | 79 | 83 | 94.3 |
| Example 2 | 1.3 | 0.054 | 78 | 87 | 79 | 86 | 98.8 | 79 | 84 | 96.6 |
| Example 3 | 0.4 | 0.055 | 79 | 86 | 79 | 86 | 100 | 79 | 85 | 98.8 |
| Example 4 | 10.7 | 0.054 | 75 | 86 | 75 | 83 | 97.1 | 75 | 80 | 93.9 |
| Example 5 | 14.9 | 0.055 | 66 | 84 | 67 | 81 | 96.5 | 66 | 78 | 92.8 |
| Example 6 | 4.0 | 0.054 | 74 | 88 | 76 | 85 | 96.8 | 75 | 82 | 93.7 |
| Example 7 | 0.4 | 0.055 | 79 | 86 | 79 | 86 | 100 | 79 | 85 | 99.1 |
| Comparative Example 1 | N.D | 0.055 | 80 | 84 | 80 | 83 | 98.8 | 80 | 76 | 90.5 |

The invention claimed is:

1. A red phosphor consisting of: comprising: a particulate of Mn-activated complex fluoride represented by the following general formula (1) that is at least partially coated with a coating layer containing bismuth:

$A_2MF_6:Mn^{4+}$  (1)

wherein A represents at least one alkali metal element selected from the group consisting of lithium, sodium, potassium, rubidium and cesium, and M represents at least one tetravalent element selected from the group consisting of silicon, germanium, tin, titanium, zirconium and hafnium.

2. The red phosphor according to claim 1, wherein the coating layer is composed of a bismuth elemental substance and/or a bismuth compound.

3. The red phosphor according to claim 2, wherein the bismuth compound is at least one selected from the group consisting of $BiF_3$, $BiCl_3$, $BiBr_3$, $BiI_3$, $Bi_2O_3$, $Bi_2S_3$, $Bi_2Se_3$, BiSb, $Bi_2Te_3$, $Bi(OH)_3$, $(BiO)_2CO_3$, BiOCl, $BiPO_4$, $Bi_2Ti_2O_7$, $Bi(WO_4)_3$, $Bi_2(SO_4)_3$, $BiOCH_3COO$, $4BiNO_3(OH)_2 \cdot BiO(OH)$, $C_3F_9O_9S_3Bi$, $C_7H_7BiO_7$, $C_9H_{21}BiO_3$, $C_{15}H_{33}BiO_3$, $C_{30}H_{57}BiO_6$, $C_{12}H_{10}BiK_3O_{14}$, and $C_6H_4(OH)CO_2BiO \cdot H_2O$.

4. The red phosphor according to claim 1, wherein the content of bismuth is in a range of 0.01% by mass to 15% by mass with respect to the total mass of the red phosphor.

5. The red phosphor according to claim 1, wherein a molar ratio of Mn in the Mn-activated complex fluoride is in a range of 0.005 to 0.15 relative to the total number of mols of M and Mn.

6. A method for producing red phosphor, which comprises a step of bringing a treatment liquid containing bismuth into contact with a Mn-activated complex fluoride particulate represented by the following general formula (1) and producing a red phosphor consisting of a coated particulate Mn-activated complex fluoride at least partially coated with a coating layer containing bismuth:

$$A_2MF_6:Mn^{4+} \qquad (1)$$

wherein A represents at least one alkali metal element selected from the group consisting of lithium, sodium, potassium, rubidium and cesium, and M represents at least one tetravalent element selected from the group consisting of silicon, germanium, tin, titanium, zirconium and hafnium.

7. The method for producing red phosphor according to claim 6, wherein the content of bismuth in the treatment liquid is in a range of 0.01% by mass to 15% by mass relative to the total mass of the treatment liquid.

8. The method for producing red phosphor according to claim 6, wherein a solvent of the treatment liquid is water, an organic solvent, a mixed solvent thereof, or an acidic solvent thereof.

9. The method for producing red phosphor according to claim 8, wherein the acidic solvent is an acidic solvent containing hydrogen fluoride, and
a mixing ratio of the acidic solvent containing hydrogen fluoride to the bismuth is in a range of 30:1 to 3,500:1 on a mass basis.

10. The method for producing red phosphor according to claim 9, wherein the concentration of the hydrogen fluoride in the acidic solvent containing hydrogen fluoride is in a range of 1% by mass to 70% by mass relative to the total mass of the acidic solvent.

11. The method for producing red phosphor according to claim 6, wherein bismuth is contained in the treatment liquid as at least one selected from the group consisting of Bi elemental substance, $BiF_3$, $BiCl_3$, $BiBr_3$, $BiI_3$, $Bi_2O_3$, $Bi_2S_3$, $Bi_2Se_3$, BiSb, $Bi_2Te_3$, $Bi(OH)_3$, $(BiO)_2CO_3$, BiOCl, $BiPO_4$, $Bi_2Ti_2O_7$, $Bi(WO_4)_3$, $Bi_2(SO_4)_3$, $BiOCH_3COO$, $4BiNO_3(OH)_2 \cdot BiO(OH)$, $C_3F_9O_9S_3Bi$, $C_7H_7BiO_7$, $C_9H_{21}BiO_3$, $C_{15}H_{33}BiO_3$, $C_{30}H_{57}BiO_6$, $C_{12}H_{10}BiK_3O_{14}$, and $C_6H_4(OH)CO_2BiO \cdot H_2O$.

* * * * *